United States Patent
Wang et al.

(10) Patent No.: US 11,196,727 B2
(45) Date of Patent: *Dec. 7, 2021

(54) SCALING IPSEC PROCESSING ON A VIRTUAL MACHINE

(71) Applicant: Nicira, Inc., Palo Alto, CA (US)

(72) Inventors: Yong Wang, Sunnyvale, CA (US); Peng Li, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/670,030

(22) Filed: Oct. 31, 2019

(65) Prior Publication Data

US 2020/0084192 A1   Mar. 12, 2020

Related U.S. Application Data (63) Continuation of application No. 15/664,582, filed on Jul. 31, 2017, now Pat. No. 10,498,708.

(51) Int. Cl.
| | |
|---|---|
| *H04L 29/06* | (2006.01) |
| *H04L 9/32* | (2006.01) |
| *H04L 12/931* | (2013.01) |
| *H04L 12/935* | (2013.01) |
| *H04L 12/741* | (2013.01) |

(52) U.S. Cl.
CPC ........ *H04L 63/0485* (2013.01); *H04L 9/3239* (2013.01); *H04L 45/74* (2013.01); *H04L 49/30* (2013.01); *H04L 63/0236* (2013.01); *H04L 63/0272* (2013.01); *H04L 63/166* (2013.01); *H04L 9/32* (2013.01); *H04L 63/02* (2013.01); *H04L 63/029* (2013.01); *H04L 63/04* (2013.01); *H04L 63/16* (2013.01)

(58) Field of Classification Search
CPC ..... H04L 63/0485; H04L 63/04; H04L 63/02; H04L 63/029; H04L 63/0236; H04L 63/0272; H04L 63/166; H04L 63/16; H04L 63/0428; H04L 9/3239; H04L 9/32; H04L 45/74; H04L 49/70; H04L 49/30
USPC ........ 713/154, 153; 712/42; 709/238; 726/5; 380/200
See application file for complete search history.

(56) References Cited

U.S. PATENT DOCUMENTS

| | | | |
|---|---|---|---|
| 7,003,118 B1 | 2/2006 | Yang et al. | |
| 7,181,612 B1 | 2/2007 | Pellacuru et al. | |
| 7,243,225 B2 * | 7/2007 | Poeluev | ................. H04L 63/04 380/200 |
| 7,814,310 B2 * | 10/2010 | Bouchard | ............. H04L 63/164 713/153 |
| 8,547,837 B2 | 10/2013 | Ronciak et al. | |

(Continued)

OTHER PUBLICATIONS

IPSec: Performance Analysis and Enhancements by Craig A. Shue, Minaxi Gupta and Steven A. Myers pp. 6: IEEE conference date (Year: 2007).*

(Continued)

*Primary Examiner* — Samson B Lemma
*Assistant Examiner* — Ali H. Cheema
(74) *Attorney, Agent, or Firm* — Patterson + Sheridan, LLP (57) ABSTRACT

Certain embodiments described herein are generally directed to performing receive side scaling at a virtual network interface card for encapsulated encrypted data packets based on an security parameter index value of the encapsulated encrypted data packets.

20 Claims, 3 Drawing Sheets

(56) References Cited

U.S. PATENT DOCUMENTS

| | | |
|---|---|---|
| 9,712,460 B1 | 7/2017 | Friend |
| 9,755,972 B1* | 9/2017 | Mao .................... H04L 45/7453 |
| 2002/0097724 A1 | 7/2002 | Halme et al. |
| 2004/0143734 A1* | 7/2004 | Buer ................... H04L 63/0485 |
| | | 713/153 |
| 2005/0198531 A1* | 9/2005 | Kaniz .................... H04L 63/164 |
| | | 726/5 |
| 2005/0213603 A1* | 9/2005 | Karighattam ....... H04L 63/0485 |
| | | 370/463 |
| 2007/0130352 A1 | 6/2007 | Chhabra et al. |
| 2009/0287848 A1 | 11/2009 | Kamura et al. |
| 2011/0153985 A1* | 6/2011 | Saha ................... H04L 63/0485 |
| | | 712/42 |
| 2015/0263974 A1 | 9/2015 | Jain et al. |
| 2016/0142307 A1* | 5/2016 | Kamper .............. H04L 12/4633 |
| | | 709/238 |
| 2016/0212098 A1* | 7/2016 | Roch ................... H04L 63/0428 |
| 2016/0277478 A1* | 9/2016 | Narasimhamurthy .. H04L 69/16 |
| 2017/0005931 A1 | 1/2017 | Mehta et al. |
| 2017/0063808 A1 | 3/2017 | Manapragada et al. |
| 2017/0063979 A1 | 3/2017 | Saeki |
| 2017/0163598 A1* | 6/2017 | Shen ....................... H04L 45/74 |
| 2018/0069924 A1* | 3/2018 | Tumuluru ............... H04L 49/70 |
| 2018/0343146 A1 | 11/2018 | Dunbar et al. |

OTHER PUBLICATIONS

NetSlices: Scalable Multi-Core Packet Processing in User-Space by Tudor Marian, Ki Suh Lee and Hakim Weatherspoon pp. 12; Dated: Oct. 29-30 (Year: 2012).*

NBA (Network Balancing Act): A High-performance Packet Processing Framework for Heterogeneous Processors By Joongi Kim, Keon Jang, Keunhong Lee, Sangwook Ma, Junhyun Shim and Sue Moon (KAIST) pp. 14; Apr. 21-25 (Year: 2015).*

Protego: Cloud-Scale Multitenant IPsec Gateway By Jeongseok Son, Yongqiang Xiong, Kun Tan, Paul Wang, Ze Gan and Sue Moon https://www.usenix.org/conference/atc17/technical-sessions/presentation/son pp. 15; Jul. 12-14 (Year: 2017).*

Kaufman, Antoine et al., High Performance Packet Processing with FlexNIC, ASPLOS '16, Apr. 2-6, 2016, Atlanta, Georgia, 15 pages.

* cited by examiner

SCALING IPSEC PROCESSING ON A VIRTUAL MACHINE

CROSS-REFERENCE TO RELATED APPLICATIONS

This application is a continuation of U.S. patent application Ser. No. 15/664,582, filed Jul. 31, 2017, the entire contents of which are incorporated by reference herein.

BACKGROUND

IP security (IPsec) protocols are widely used to protect packets communicated between endpoints (EPs), such as over the Internet, between gateways, between data centers (e.g., on premises data centers, cloud data centers, etc.), within data centers, etc. For example, security associations (SAs) may be established between the endpoints. In some embodiments, each security association is a one-way or simplex connection, and therefore at least two security associations, one for each direction, are established between two IPsec peers (e.g., endpoints). These security associations are a form of contract between the endpoints detailing how to exchange and protect information among each other. In some embodiments, each security association is comprised of a mutually agreed-upon key, one or more security protocols, and/or a security parameter index (SPI) value. After security associations have been established between two endpoints, an IPsec protocol may be used to protect data packets for transmission.

For IPsec in the Encapsulating Security Payload (ESP) tunnel mode, tunnel endpoints may be used for applying IPsec protocols to encrypt and encapsulate egress packets from a source endpoint and decrypt and decapsulate ingress packets for a destination endpoint to secure communication between the endpoints. For example, a source endpoint may be configured to generate and route egress IP packets to a source tunnel endpoint associated with the source endpoint. In particular, the source endpoint may generate an IP packet including a header with the IP address of the source endpoint set as the source IP address and the IP address of the destination endpoint set as the destination IP address. A MAC address of the source tunnel endpoint may further be set as a next-hop MAC address of the IP packet in the header.

The source tunnel endpoint receives the IP packet and encrypts the original IP packet including the header of the original IP packet based on a security association established between the source endpoint and the destination endpoint. For example, the source tunnel endpoint encrypts the original IP packet with a mutually agreed-upon key of the security association between the source EP and the destination EP. The source tunnel endpoint further encapsulates the encrypted packet by adding a new IP header and an ESP header (e.g., including an SPI value corresponding to the security association used to encrypt the packet) to the encrypted packet to generate an encapsulated ESP encrypted data packet. In the new IP header, the source tunnel endpoint includes a source IP address of the source tunnel endpoint and a destination IP address of the destination tunnel endpoint. The new IP header is used to forward the encapsulated ESP encrypted data packet through a network from the source tunnel endpoint to the destination tunnel endpoint.

The destination tunnel endpoint may then decapsulate and decrypt the encapsulated ESP encrypted data packet to extract the original IP packet. For example, the destination tunnel endpoint may determine the security association (e.g., mutually agreed-upon key) to use to decrypt the encapsulated ESP encrypted data packet based on the SPI value included in the ESP header. Based on the destination IP address in the header of the original IP packet, the destination tunnel endpoint forwards the original IP packet to the destination endpoint.

IPsec protocols may be deployed in virtualized computing instances (e.g., a virtual machine (VM) or container) to gain the benefits of virtualization and network functions virtualization (NFV). For example, virtual computing instances may be configured to serve as tunnel endpoints as described. However, use of such IPsec protocols by virtualized computing instances may cause certain other features at the virtualized computing instances to function improperly.

In a virtualized environment, virtual network interface controllers (VNICs) are instantiated in a virtualization layer (also referred to herein as the "hypervisor") supporting such virtualized computing instances and are programmed to behave similarly to physical NICs (PNICs). One feature both PNICs and VNICs have supported is receive side scaling (RSS), which involves computing a hash of incoming packet header attributes and distributing the incoming network traffic across CPUs for processing based on the computed hash values. Packets belonging to the same connection are distributed to the same RSS queue, based on the computed hash value, for processing by a particular CPU. For a VNIC, packets are distributed to virtual RSS queues associated with the VNIC based on the computed hash value. The packets in a virtual RSS queue are processed by a particular virtual CPU associated with the virtual RSS queue.

Traditionally, for a VNIC, RSS is performed for IP packets based on a detected packet type indicated by an IP protocol number in an IP header of the packet that indicates the next higher layer protocol being carried as the IP payload. For example, the VNIC may be configured to perform RSS only for packets of type ICMP, UDP, and TCP, corresponding to IP protocol numbers 1, 6, and 17, respectively. However, for packets encapsulated using ESP tunnel mode, the IP protocol number in the new IP header may be 50. Accordingly, the VNIC may not be configured to perform RSS for received encapsulated ESP encrypted data packets.

Further, the hash computed for selecting a RSS queue is traditionally computed based on the source IP address and destination IP address in the header of the packet. In an encapsulated ESP encrypted data packet, the only available (i.e., non-encrypted) IP addresses for computing the hash are the source IP address of the source tunnel endpoint and the destination IP address of the destination tunnel endpoint. Accordingly, at a VNIC of a destination tunnel endpoint, all encapsulated ESP encrypted data packets received from the same source tunnel endpoint, regardless of the source endpoint that sent the packet and the destination endpoint, would have the same source IP address and destination IP address in the new IP header, and therefore hash to the same value and be assigned to the same virtual RSS queue. Therefore, RSS could not be used to distribute processing of such encapsulated ESP encrypted data packets amongst multiple virtual RSS queues and accordingly multiple virtual CPUs.

SUMMARY

Herein described are one or more embodiments of a method for processing encapsulated encrypted data packets at a virtual network interface card (VNIC) on a host machine. The method includes receiving at the VNIC an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint. The method further includes calculating a hash value based at least in part on the SPI value. The method further includes assigning the encapsulated encrypted data packet to a first VNIC receive side scaling (RSS) queue of a plurality of VNIC RSS queues associated with the VNIC based on the hash value.

Also described herein are embodiments of a non-transitory computer readable medium comprising instructions to be executed in a computer system, wherein the instructions when executed in the computer system perform the method described above for processing encapsulated encrypted data packets at a VNIC on a host machine.

Also described herein are embodiments of a computer system, wherein software for the computer system is programmed to execute the method described above for processing encapsulated encrypted data packets at a VNIC on a host machine.

Also described herein are embodiments of a computer system comprising means for executing the method described above for processing encapsulated encrypted data packets at a VNIC on a host machine.

DETAILED DESCRIPTION

Embodiments presented herein relate to systems and methods for performing RSS at a VNIC of a destination tunnel endpoint for encapsulated ESP encrypted data packets.

Figure 1:
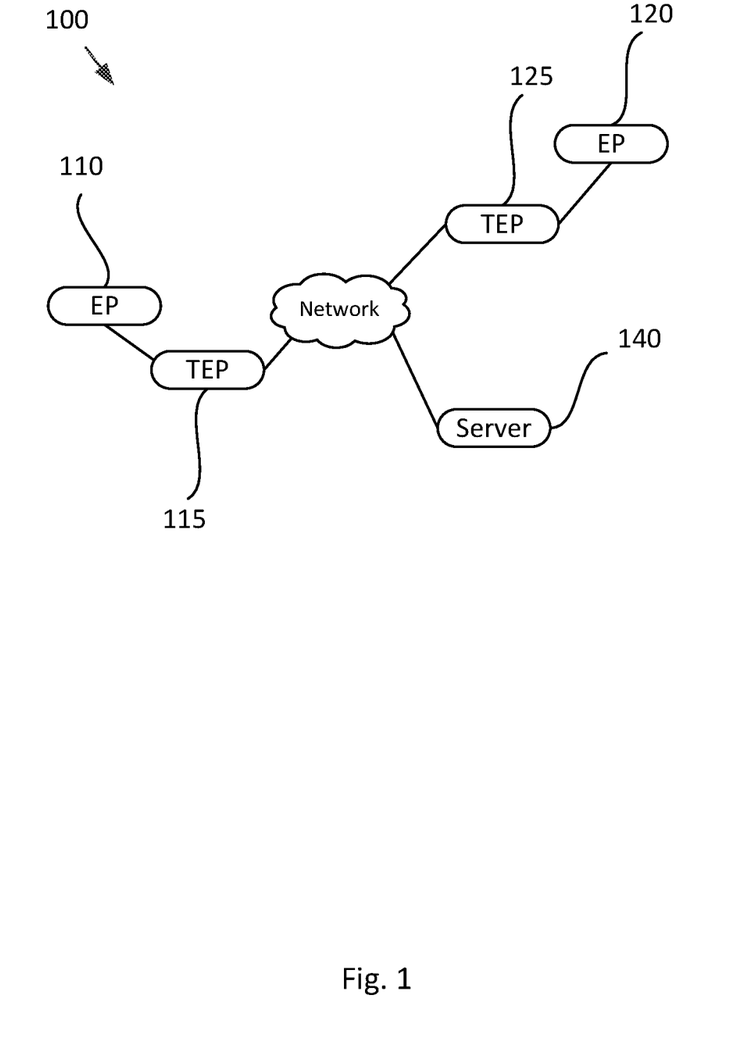
FIG. 1 illustrates an example of a network, in accordance with some embodiments.

FIG. 1 illustrates an example of a network 100. In certain embodiments, network 100 represents a physical network. As shown by FIG. 1, network 100 connects a plurality of tunnel endpoints (TEPs), including TEP 115 and TEP 125, and a server 140. A TEP may be a physical computing device (e.g., physical server, physical host). In certain embodiments, a TEP may be a virtualized computing instance as further discussed herein.

TEPs 115 and 125 may connect endpoints (EPs), including EP 110 and EP 120, in a logical overlay network. An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, an EP may be a virtualized computing instance (e.g., virtual machine, container, data compute node, isolated user space instance) as further discussed herein.

In network 100, EPs may communicate with or transmit data packets to other EPs via tunnel endpoints (TEPs) as discussed. EP 110 may transmit a data packet to EP 120 in a secured fashion via TEPs 115 and 125, acting as a source TEP and a destination TEP, respectively. TEPs 115 and 125 may implement IPsec protocols, including ESP tunnel mode, to secure communication between one another. In some embodiments, before any data can be securely transferred using the IPsec framework, security associations (e.g., including a mutually agreed-upon key, one or more security protocols, and/or a SPI value) may need to be established between the two TEPs for the two EPs.

The mutually agreed-upon key (e.g., encryption/decryption key), in some embodiments, is generated by a server (e.g., server 140) and subsequently distributed to TEPs 115 and 125 associated with the EPs 110 and 120. The one or more security protocols, described above, may be one or more IPsec security protocols such as Authentication Header (AH), Encapsulating Security Payload (ESP), etc. After security associations have been established for the two EPs 110 and 120, one or more of these security protocols may be used to protect data packets for transmission. Though certain embodiments are described herein with respect to the ESP security protocol, other suitable IPsec security protocols (e.g., AH protocol) in alone or combination with ESP, may be used in accordance with the embodiments described herein. Further, the embodiments described herein may similarly be used for different types of traffic such as IPv4, IPv6, etc. Further, the techniques described herein for assigning packets to VNIC RSS queues may be dynamically turned on or off (e.g., at a TEP) in some embodiments. In certain embodiments, the techniques herein can be used to hash ESP packets encapsulated in other packet types (e.g., VXLAN or Geneve). Further, in such embodiments where ESP packets are encapsulated in other packet types, the techniques herein for hashing based at least in part on SPI value may also be applicable not only at the VNIC level as described, but also at the hardware level (e.g., PNIC), operating system level, etc., and may similarly be applicable to PNIC RSS queues.

In addition to a mutually agreed-upon key and security protocol, a security association includes an SPI value. In some embodiments, each SPI value is a binary value associated with a security association, which enables a TEP to distinguish among multiple active security associations. As an example, SPI values may be used to distinguish between the inbound and outbound security associations of different EPs. In some cases, the Internet Key Exchange (IKE) protocol is used to generate these SPI values and encryption/decryption keys in the IPsec framework. For example, prior to any data exchange, IKE performs a two-phase negotiation session, which results in establishing two security associations between two IPsec peers (e.g., TEPs). These security associations may not only contain mutually agreed-upon encryption and decryption keys to be used for incoming and outgoing traffic (e.g., of an EP), but also maintain sequence numbers for each data transfer. These sequence numbers are maintained to ensure anti-replay, which prevents hackers from injecting or making changes in data packets that travel from a source to a destination TEP. However, if the IKE protocol is used to establish these security associations in a network with, for instance, (N) number of EPs, then each TEP may need to set up (N−1) IKE negotiation sessions for each EP the TEP is associated with.

Accordingly, in some cases, instead of using IKE, distributed network encryption (DNE) may be utilized to simplify key management, including key generation and exchange, and SPI allocation. DNE provides a central unit, e.g. server 140, that generates and distributes encryption/decryption keys and SPI values for EPs to TEPs in a network. DNE also simplifies protecting network traffic of TEPs by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define what key policy is used by server 140 to generate an encryption/decryption key for data transfer between TEPs for EPs in a network. In some embodiments, each key policy may be associated with one or more EPs and include certain specifications (e.g., one or more of an algorithm, action, strength of the key, etc.) that define properties of an encryption/decryption key.

Figure 2:
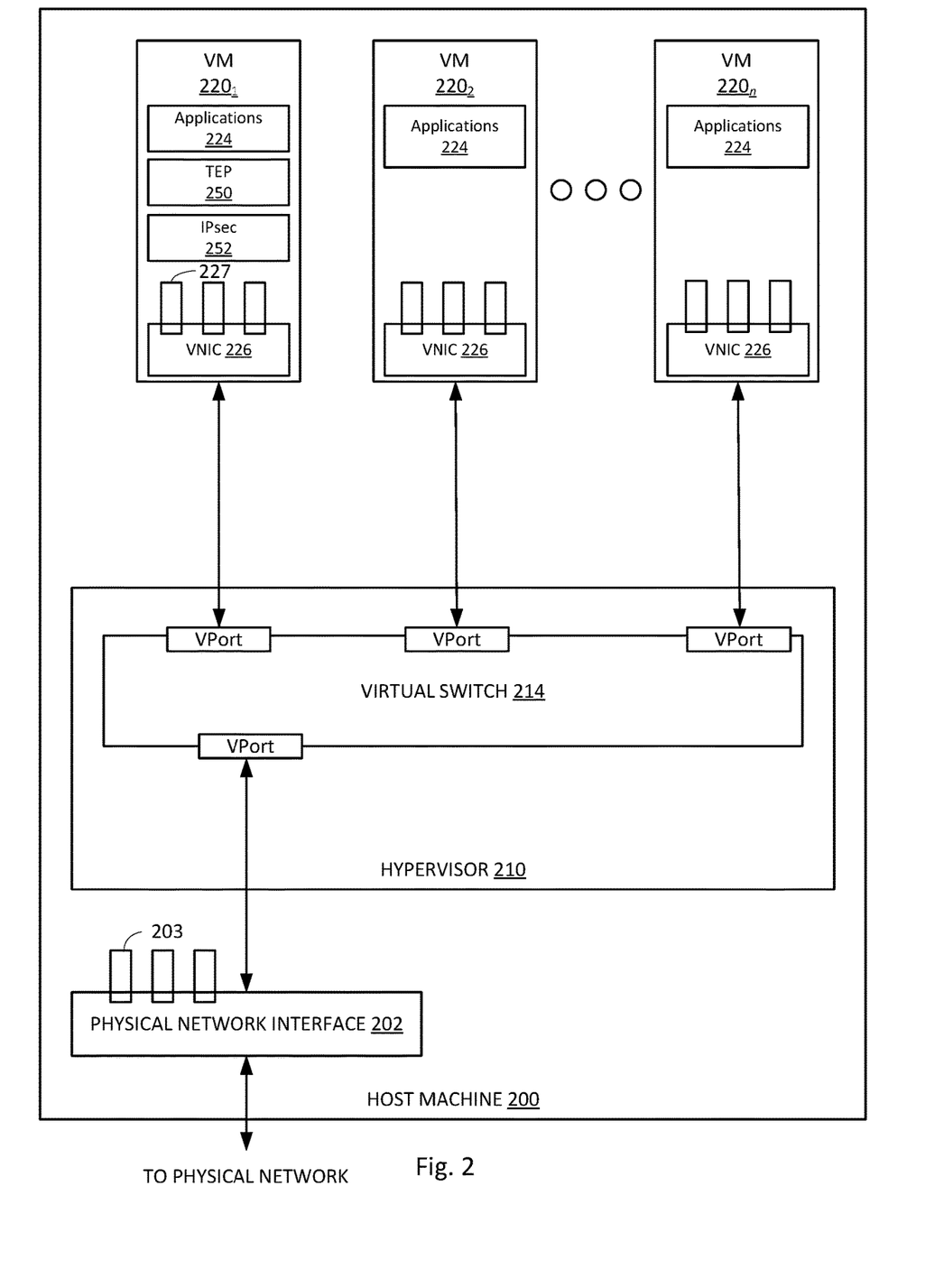
FIG. 2 illustrates an example block diagram of host machine for use in a virtualized network environment, according with some embodiments.

FIG. 2 illustrates an example block diagram of host machine 200 for use in a virtualized network environment, according to some embodiments. As illustrated, host machine 200 includes a physical network interface controller (PNIC) 202, a hypervisor 210, and a plurality of virtual machines $220_1, 220_2, \ldots 220_n$.

Host machine 200 may provide part of the computing infrastructure in a virtualized computing environment distributed among multiple host machines. Though certain embodiments are described herein with respect to VMs, the same principals and techniques may also apply to other appropriate virtual computing instances (e.g., virtual machine, container, data compute node, isolated user space instance). In certain embodiments, host machine 200 is a physical general purpose computer (e.g., a server, workstation, etc.). Although not shown in FIG. 2, host machine 200 may include one or more physical central processing units (CPUs), system memory, and non-volatile data storage, in addition to one or more physical network interfaces, such as PNIC 202, for communicating with other hardware computing platforms, entities, or host machines on a physical network accessible through PNIC 202.

Hypervisor 210 serves as an interface between virtual machines 220 and PNIC 202, as well as other physical resources (including physical CPUs) available on host machine 200. Each VM 220 is shown including a virtual network interface card (VNIC) 226, which is responsible for exchanging packets between VM 220 and hypervisor 210. Though shown as included in VMs 220, it should be understood that VNICs 226 may be implemented by code (e.g., VM manager code) associated with hypervisor 210. VNICs 226 may be, in some cases, a software abstraction of a physical network interface card. Each VM 220 is connected to a virtual port (vport) provided by virtual switch 214 through the VM's associated VNIC 226. Virtual switch 214 may serve as physical network switch, i.e., serve as an edge device on the physical network, but implemented in software. Virtual switch 214 is connected to PNIC 202 to allow network traffic to be exchanged between VMs 220 executing on host machine 200 and destinations on an external physical network.

In certain embodiments, each VNIC 226 may be configured to perform RSS. Accordingly, each VNIC 226 may be associated with a plurality of software based VNIC RSS queues 227 on host machine 200. Each of the VNIC RSS queues 227 may be associated with a virtual CPU (e.g., a different virtual CPU). In certain embodiments, a virtual CPU may correspond to different resources (e.g., time slots, compute cycles, etc.) of one or more physical CPUs of host machine 200. When receiving incoming packets, VNIC 226, as discussed, may be configured to compute a hash value based on header attributes of the incoming packets and distribute the incoming packets among the VNIC RSS queues 227 associated with VNIC 226. For example, different hash values may be mapped to different VNIC RSS queues 227. The incoming packets stored in each VNIC RSS queue 227 are then processed by the corresponding virtual CPU associated with the VNIC RSS queue 227. Therefore, no single virtual CPU is loaded with processing all incoming packets for VNIC 226. Further, the processing of packets is distributed to different virtual CPUs at the VNIC and at the beginning of the processing pipeline for the packets, therefore taking advantage of distributed processing of packets at an early stage in the processing pipeline.

In some embodiments, a VM 220 is configured to perform the functions of a TEP. For example, VM $220_1$ may be configured as a TEP and include a TEP component 250 to implement TEP functions. VM $220_1$ may also be configured to implement IPsec protocols and functionality using an IPsec component 252. Further, another VM 220 may be configured as an EP associated with VM $220_1$. For example, VM $220_2$ may be an EP associated with the TEP VM $220_1$. Accordingly, in some embodiments, another source EP may generate an IP packet to send to VM $220_2$. The source EP may forward the IP packet to a source TEP, which encrypts (e.g., using an IPsec component 252) and encapsulates (e.g., using a TEP component 250) the packet using an IPsec protocol (e.g., ESP tunnel mode) to generate an encapsulated ESP encrypted data packet. The source TEP then sends the encapsulated ESP encrypted data packet to destination TEP VM $220_1$. The encapsulated ESP encrypted data packet is therefore received at virtual switch 214 of host machine 200 via PNIC 202. Virtual switch 214 sends the encapsulated ESP encrypted data packet to VNIC 226 of VM $220_1$.

Figure 3:
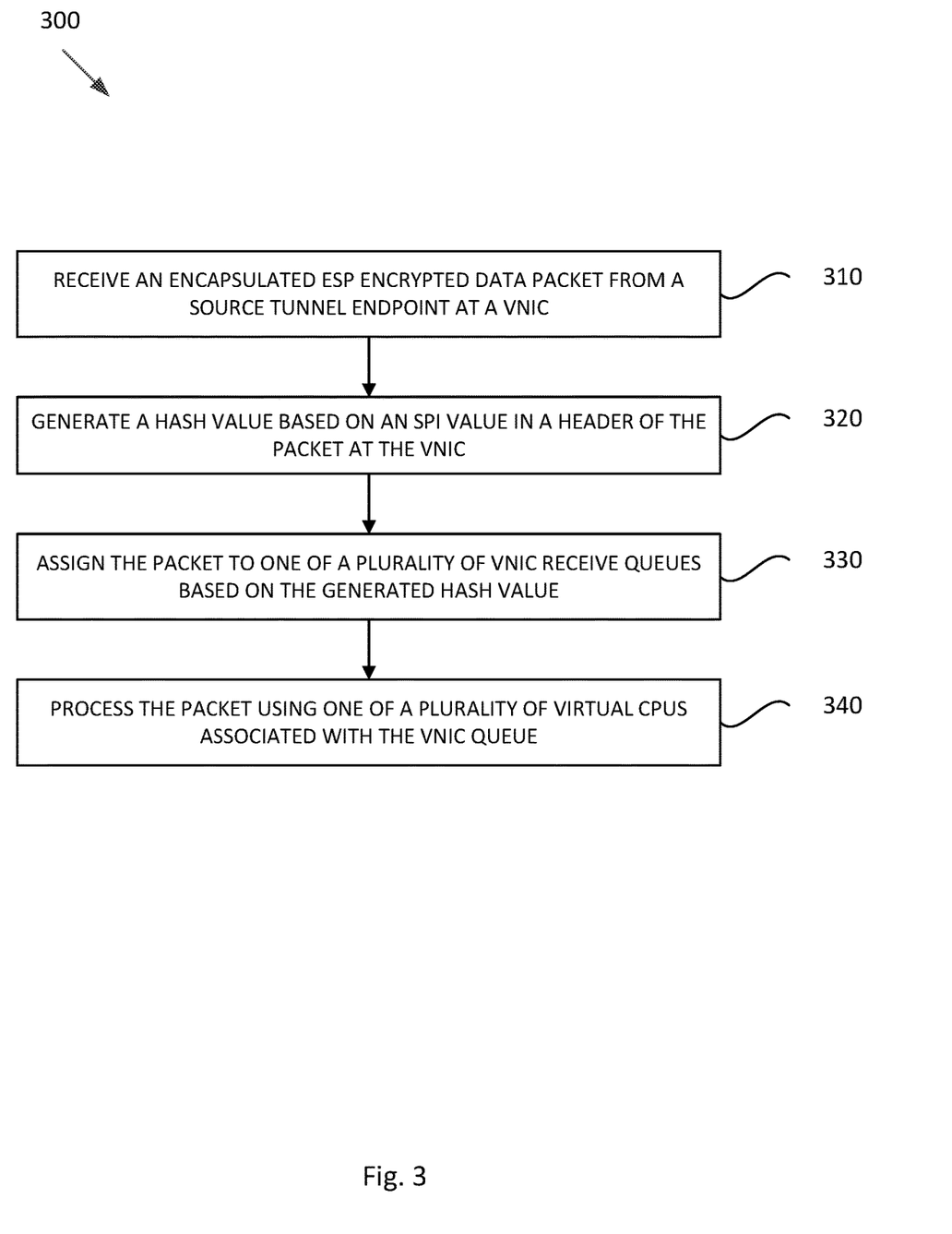
FIG. 3 illustrates example operations for use by a destination tunnel endpoint for processing a packet received from a source tunnel endpoint, in accordance with some embodiments.

FIG. 3 illustrates example operations 300 for use by destination TEP VM $220_1$ for processing the encapsulated ESP encrypted data packet received from the source TEP, in accordance with some embodiments.

At 310, VNIC 226 receives the encapsulated ESP encrypted data packet as described. At 320, VNIC 226 generates (e.g., computes) a hash value based at least in part on an SPI value included in the ESP header of the encapsulated ESP encrypted data packet. For example, VNIC 226 identifies the encapsulated ESP encrypted data packet as an ESP packet based on an IP protocol number in the header of the packet indicating it is an ESP packet (e.g., equal to 50), and therefore calculates the hash value based at least in part on the SPI value. As discussed, each security association for a pair of EPs may have a different associated SPI value. For example, destination TEP VM $220_1$ may use a first security association for packets sent from a first source EP via a source TEP for VM $220_2$, and a second security association for packets sent from a second source EP via the same source TEP for VM $220_2$. Accordingly, even though encapsulated ESP encrypted data packets may be received at destination TEP VM $220_1$ from the same source TEP and therefore have the same source and destination IP addresses in the new header of each of the encapsulated ESP encrypted data packets, different hash values may be calculated for the packets based at least in part on the different SPI values. In some embodiments, the hash value is further computed based on the source and/or destination IP addresses in the new header, such as to add further entropy to the hash value calculation.

At 330, VNIC 226 assigns the encapsulated ESP encrypted data packet to one of the plurality of VNIC RSS queues 227 based on the generated hash value. At 340, a virtual CPU associated with the VNIC RSS queue 227 to which the encapsulated ESP encrypted data packet is assigned processes the encapsulated ESP encrypted data packet. For example, the virtual CPU is used to decapsulate (e.g., using TEP component 250) and decrypt (e.g., using IPsec component 252) the packet. The original IP packet is then sent to virtual switch 214, which forwards the packet to VM $220_2$.

Based on the operations 300, RSS can be enabled for incoming encapsulated ESP encrypted data packets received at a VNIC.

In some embodiments, PNIC 202 may also be configured to perform RSS and be associated with a plurality of software or hardware (e.g., implemented in PNIC 202) based PNIC RSS queues 203. Each of the PNIC RSS queues 203 may be associated with a physical CPU configured to process packets for the PNIC RSS queue 203. Different PNIC RSS queues 203 may be associated with different physical CPUs. PNIC 202 may be configured to compute a hash value for assigning packets to the PNIC RSS queues 203. For example, PNIC 202 may be configured to compute a hash value based on a source IP address and destination IP address, but not an SPI value, in an encapsulated ESP encrypted data packet. In certain aspects, VNIC 226 may use the hash value calculated by PNIC 202 in addition to the SPI value in the encapsulated ESP encrypted data packet to generate a hash value for assigning the encapsulated ESP encrypted data packet to a VNIC RSS queue 227. For example, instead of calculating a hash value based on the source IP address, destination IP address, and SPI value itself, VNIC 226 may use the hash value computed by PNIC 202 and at least the SPI value to calculate another hash value, which may be less computationally expensive. PNIC 202 may be configured to send the hash value calculated by PNIC 202 to VNIC 226 by including the hash value in the encapsulated ESP encrypted data packet itself (e.g., in a field of the header), by passing the hash value via the hypervisor 210, or using any other suitable mechanism.

In some embodiments, the security associations between EPs may change periodically (e.g., after a certain amount of time, after a certain amount of data has been exchanged, etc.). Accordingly, the SPI values associated with the security associations between EPs may change periodically. When the SPI value changes, the virtual CPU assigned to process packets for a given flow between a source EP and a destination EP may also change based on the change of the hash value (based at least in part on the SPI value) used to assign the packet to a given VNIC RSS queue. In such a scenario, packets of a given flow may be processed out of order, as one virtual CPU may process packets at different times or rates than another virtual CPU. In order to prevent such out of order processing of packets, in certain embodiments, all previous packets of a given flow (prior to the change in SPI value) are processed by the previous virtual CPU before new packets for the flow (after the change in SPI value) are processed by the new virtual CPU.

In another embodiment, to prevent out of order processing of packets when the SPI value used for the security association for packets of a flow changes, destination TEP VM $220_1$ is designed to redirect the packets of the flow to the same VNIC RSS queue even though the SPI value has changed. For example, VM $220_1$ may receive a new security association with a new SPI value for a flow. Accordingly, VNIC 226 hashes the new SPI value of the new security association to a different hash value than the hash value calculated based at least in part on the previous SPI value of the previous security association. Therefore, in some embodiments VNIC 226 is configured to redirect packets that hash to the different hash value to the same VNIC RSS queue 227 as used for packets that hash to the previous hash value. Accordingly, the same virtual CPU associated with the VNIC RSS queue 227 is used to process packets for the flow, even though the SPI value has changed, which prevents out of order processing of packets. For example, VNIC 226 may be configured to use a table mapping hash values to VNIC RSS queues 227 to redirect packets with different hash values to the same VNIC RSS queues 227. For any hash values with an entry in the table, they may be redirected to the corresponding VNIC RSS queue 227 based on the mapping. Accordingly, VM $220_1$ may update the mapping to include an entry for the new hash value to the VNIC RSS queue 227 used for the previous hash value in the table.

It should be noted that the order of certain operations 300 may be changed, additional operations added, operations removed, etc.

In host machine 200, processing unit(s) may retrieve instructions to execute and data to process in order to execute the processes discussed herein. The processing unit(s) may be a single processor or a multi-core processor in different embodiments. The read-only-memory (ROM) may store static data and instructions that may be utilized by the processing unit(s) and other modules of the electronic system. The permanent storage device, on the other hand, may be a read-and-write memory device. The permanent storage device may be a non-volatile memory unit that stores instructions and data even when the host machine is off. Some embodiments use a mass-storage device (such as a magnetic or optical disk and its corresponding disk drive) as the permanent storage device.

Some embodiments use a removable storage device (such as a floppy disk, flash drive, etc.) as the permanent storage device. Like permanent storage device, the system memory may be a read-and-write memory device. However, unlike permanent storage device, the system memory may be a volatile read-and-write memory, such as a random access memory (RAM). The system memory may store some of the instructions and data that processing unit(s) utilize at runtime. In some embodiments, processes discussed herein are stored in the system memory, the permanent storage device, and/or the read-only memory.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers" (see, e.g., www.docker- .com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for processing encapsulated encrypted data packets at a virtual network interface card (VNIC) on a host machine, comprising:

receiving at the VNIC an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;

determining a packet type of the encapsulated encrypted data packet based on an IP protocol number included in the first header of the encapsulated encrypted data packet;

in response to the determined packet type indicating the encapsulated encrypted data packet is a type of packet having the SPI value, calculating a hash value based at least in part on the SPI value; and assigning the encapsulated encrypted data packet to a first VNIC receive side scaling (RSS) queue of a plurality of VNIC RSS queues associated with the VNIC based on the hash value, wherein each of the plurality of VNIC RSS queues is associated with a different virtual CPU configured to process packets in the corresponding VNIC RSS queue, wherein each virtual CPU corresponds to resources of one or more physical CPUs of the host machine.

2. The method of claim 1, wherein the hash value is further calculated based on the source IP address of the source tunnel endpoint and the destination IP address of the destination tunnel endpoint.

3. The method of claim 1, wherein the hash value is further calculated based on a second hash value calculated by a physical network interface card (PNIC) on the host machine for the encapsulated encrypted data packet.

4. The method of claim 1, wherein the determined packet type is an encapsulating security payload type.

5. The method of claim 1, further comprising:
receiving at the VNIC a second encapsulated encrypted data packet comprising a third header comprising a second SPI value different than the SPI value and a fourth header comprising the source IP address of the source endpoint and the destination IP address of the destination endpoint; and
calculating a second hash value based at least in part on the second SPI value; and
redirecting the second encapsulated encrypted data packet to the first VNIC RSS queue based on the source IP address of the source endpoint and the destination IP address of the destination endpoint being included in the second encapsulated encrypted data packet.

6. The method of claim 1, further comprising:
receiving at the VNIC a second encapsulated encrypted data packet comprising a third header comprising a second SPI value different than the SPI value and a fourth header comprising the source IP address of the source endpoint and the destination IP address of the destination endpoint;
calculating a second hash value based at least in part on the second SPI value;
assigning the second encapsulated encrypted data packet to a second VNIC RSS queue of the plurality of VNIC RSS queues based on the second hash value; and
processing the encapsulated encrypted data packet prior to processing the second encapsulated encrypted data packet.

7. A non-transitory computer readable medium comprising instructions to be executed in a computer system, wherein the instructions when executed in the computer system perform a method for processing encapsulated encrypted data packets at a virtual network interface card (VNIC) on a host machine, the method comprising:
receiving at the VNIC an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;
determining a packet type of the encapsulated encrypted data packet based on an IP protocol number included in the first header of the encapsulated encrypted data packet;
in response to the determined packet type indicating the encapsulated encrypted data packet is a type of packet having the SPI value, calculating a hash value based at least in part on the SPI value; and
assigning the encapsulated encrypted data packet to a first VNIC receive side scaling (RSS) queue of a plurality of VNIC RSS queues associated with the VNIC based on the hash value, wherein each of the plurality of VNIC RSS queues is associated with a different virtual CPU configured to process packets in the corresponding VNIC RSS queue, wherein each virtual CPU corresponds to resources of one or more physical CPUs of the host machine.

8. The non-transitory computer readable medium of claim 7, wherein the hash value is further calculated based on the source IP address of the source tunnel endpoint and the destination IP address of the destination tunnel endpoint.

9. The non-transitory computer readable medium of claim 7, wherein the hash value is further calculated based on a second hash value calculated by a physical network interface card (PNIC) on the host machine for the encapsulated encrypted data packet.

10. The non-transitory computer readable medium of claim 7, wherein the determined packet type is an encapsulating security payload type.

11. The non-transitory computer readable medium of claim 7, wherein the method further comprises:
receiving at the VNIC a second encapsulated encrypted data packet comprising a third header comprising a second SPI value different than the SPI value and a fourth header comprising the source IP address of the source endpoint and the destination IP address of the destination endpoint; and
calculating a second hash value based at least in part on the second SPI value; and
redirecting the second encapsulated encrypted data packet to the first VNIC RSS queue based on the source IP address of the source endpoint and the destination IP address of the destination endpoint being included in the second encapsulated encrypted data packet.

12. The non-transitory computer readable medium of claim 7, wherein the method further comprises:
receiving at the VNIC a second encapsulated encrypted data packet comprising a third header comprising a second SPI value different than the SPI value and a fourth header comprising the source IP address of the source endpoint and the destination IP address of the destination endpoint;
calculating a second hash value based at least in part on the second SPI value;
assigning the second encapsulated encrypted data packet to a second VNIC RSS queue of the plurality of VNIC RSS queues based on the second hash value; and
processing the encapsulated encrypted data packet prior to processing the second encapsulated encrypted data packet.

13. A computer system, comprising:
a memory; and
one or more processors coupled to the memory, the one or more processors being configured to:
receive at a virtual network interface card (VNIC) an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;

determine a packet type of the encapsulated encrypted data packet based on an IP protocol number included in the first header of the encapsulated encrypted data packet;

in response to the determined packet type indicating the encapsulated encrypted data packet is a type of packet having the SPI value, calculate a hash value based at least in part on the SPI value; and assign the encapsulated encrypted data packet to a first VNIC receive side scaling (RSS) queue of a plurality of VNIC RSS queues associated with the VNIC based on the hash value, wherein each of the plurality of VNIC RSS queues is associated with a different virtual CPU configured to process packets in the corresponding VNIC RSS queue.

14. The computer system of claim 13, wherein the hash value is further calculated based on the source IP address of the source tunnel endpoint and the destination IP address of the destination tunnel endpoint.

15. The computer system of claim 13, wherein the hash value is further calculated based on a second hash value calculated by a physical network interface card (PNIC) on the computer system for the encapsulated encrypted data packet.

16. The computer system of claim 13, wherein the determined packet type is an encapsulating security payload type.

17. The computer system of claim 13, wherein each virtual CPU corresponds to resources of one or more of the one or more processors.

18. The computer system of claim 13, wherein the one or more processors are further configured to:

receive at the VNIC a second encapsulated encrypted data packet comprising a third header comprising a second SPI value different than the SPI value and a fourth header comprising the source IP address of the source endpoint and the destination IP address of the destination endpoint;

calculate a second hash value based at least in part on the second SPI value; and redirect the second encapsulated encrypted data packet to the first VNIC RSS queue based on the source IP address of the source endpoint and the destination IP address of the destination endpoint being included in the second encapsulated encrypted data packet.

19. The computer system of claim 13, wherein the one or more processors are further configured to:

receive at the VNIC a second encapsulated encrypted data packet comprising a third header comprising a second SPI value different than the SPI value and a fourth header comprising the source IP address of the source endpoint and the destination IP address of the destination endpoint;

calculate a second hash value based at least in part on the second SPI value;

assigning the second encapsulated encrypted data packet to a second VNIC RSS queue of the plurality of VNIC RSS queues based on the second hash value; and process the encapsulated encrypted data packet prior to processing the second encapsulated encrypted data packet.

20. A method for processing encapsulated encrypted data packets at a physical network interface card (PNIC) on a computing device, comprising:

receiving at the PNIC an encapsulated encrypted data packet, the encapsulated encrypted data packet comprising a first header and an encrypted payload, the first header comprising a source IP address of a source tunnel endpoint, a destination IP address of a destination tunnel endpoint, and a security parameter index (SPI) value corresponding to a security association between a source endpoint and a destination endpoint, the encrypted payload comprising a second header comprising a source IP address of the source endpoint and a destination IP address of the destination endpoint;

determining a packet type of the encapsulated encrypted data packet based on an IP protocol number included in the first header of the encapsulated encrypted data packet;

in response to the determined packet type indicating the encapsulated encrypted data packet is a type of packet having the SPI value, calculating a hash value based at least in part on the SPI value; and assigning the encapsulated encrypted data packet to a first PNIC receive side scaling (RSS) queue of a plurality of PNIC RSS queues associated with the PNIC based on the hash value, wherein the hash value is further calculated based on the source IP address of the source tunnel endpoint and the destination IP address of the destination tunnel endpoint.

* * * * *